United States Patent [19]

Huber

[11] Patent Number: 5,131,527
[45] Date of Patent: Jul. 21, 1992

[54] DRIVE ROLLER UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 814,805

[22] Filed: Dec. 31, 1991

[30] Foreign Application Priority Data

Jan. 28, 1991 [DE] Fed. Rep. of Germany ....... 4102424

[51] Int. Cl.⁵ .............................................. B65G 13/02
[52] U.S. Cl. ..................................... 198/782; 198/788
[58] Field of Search ............... 198/782, 788, 780, 791; 244/137.1

[56] References Cited

U.S. PATENT DOCUMENTS

| 3,690,440 | 9/1972 | Macpherson | 198/782 |
| 3,698,539 | 10/1972 | Schwarzbeck | 198/782 |
| 3,712,454 | 1/1973 | McKee | 198/782 |
| 3,737,022 | 6/1973 | DeNeefe et al. | 198/782 |
| 4,697,694 | 10/1987 | Huber | 198/782 |
| 4,792,037 | 12/1988 | Huber | 198/782 X |
| 5,025,915 | 6/1991 | Huber | 198/782 |
| 5,033,611 | 7/1991 | Huber | 198/782 |
| 5,048,672 | 9/1991 | Sundseth | 198/782 |

Primary Examiner—D. Glenn Dayoan
Attorney, Agent, or Firm—Sughrue, Mion, Zinn, Macpeak & Seas

[57] ABSTRACT

A drive roller unit for driving an article on a conveyor track has a mounting frame structure of which one end is mounted to a base pivotably about an axis extending transversely to the direction of movement of the article, and a cam control unit for raising the free end of the mounting frame structure. A drive roller is mounted rotatably in the mounting frame structure to engage with an article disposed thereabove, only when the mounting frame structure is in a raised position. An electric motor drives a main transmission arrangement having first and second outputs of which one drives the cam control unit and the other drives the drive roller by way of a further transmission arrangement. Of the two outputs it is only ever that one which is subjected to a lower braking moment that rotates so that when the drive roller unit is initially switched on the mounting frame structure is first raised by the cam control unit and then the drive roller is driven in rotation. The axis of rotation of the electric motor is perpendicular to the axis of rotation of the drive roller and the further transmission arrangement has an angle of 90° between its input direction of rotation and its output direction of rotation.

12 Claims, 3 Drawing Sheets

DRIVE ROLLER UNIT

BACKGROUND OF THE INVENTION

The present invention relates generally to a drive roller unit for driving articles to be conveyed on a conveyor track.

Roller-type or ball-type conveyor tracks in which articles to be conveyed thereon are supported movably on a plurality of support rollers or balls include drive roller units for driving the articles to be conveyed, such as freight containers. A preferred area of use of such arrangements are freight loading systems in air freight traffic in which the containers are transported in the freight compartment of an aircraft on roller-type or ball-type conveyor tracks to move the containers to the anchorage locations at which they are to be disposed during a flight.

A drive roller unit as is disclosed for example in U.S. Pat. No. 3,698,539 comprises a base frame which in use is secured to the floor of a freight compartment and on which a mounting frame structure is pivotably mounted. In the vicinity of its pivot axis the mounting frame structure carries a motor while at a spacing relative to its pivot axis it carries a drive roller which is mounted rotatably but in a stationary position with respect to the mounting frame structure. The axis of rotation of the drive roller extends parallel to the axis of rotation of the motor. That unit also includes a cam control arrangement which is connected to the free end of the mounting frame structure and by means of which the mounting frame structure can be pivoted from a lowered rest position into a raised operative position, relative to the base frame of the unit. The output shaft of the motor is coupled by way of a transmission train to the input of a planetary transmission which forms a main transmission arrangement and which has two outputs of which one is coupled by way of a further transmission arrangement to the drive shaft of the drive roller while the other output of the planetary transmission serves to drive the cam control unit. For that purpose said other output of the planetary transmission has a tooth arrangement meshing with a gear which is carried non-rotatably on a shaft which is arranged on the mounting frame structure in the immediate vicinity of the pivot axis thereof. In order to transmit the torque from there to the cam control unit which is disposed at the opposite free end of the mounting frame structure, a chain wheel is non-rotatably mounted on the above-mentioned shaft which carries the gear, and the chain wheel is drivingly connected by way of a chain to a second chain wheel which is non-rotatably carried on the shaft of the cam control unit.

In the rest condition of the unit the mounting frame structure lies on the base or main frame so that the drive roller is in a lowered position at a spacing from the bottom of a freight container which is moved thereover on for example a roller conveyor track. In order to apply to the freight container a force for maintaining movement thereof, the motor is first switched on to drive the input of the planetary transmission. At that time the drive roller is prevented from rotating by virtue of the inclusion in the arrangement of a slipping clutch with a predetermined level of braking torque, so that the drive moment of the motor necessarily acts by way of the other output of the planetary transmission to drive the cam control arrangement which accordingly, by means of its cams which bear against the base frame, pivots the free end of the mounting frame structure upwardly into the operative position until the drive roller comes into engagement with the underside of the bottom of the freight container. Due to the weight of the freight container, that engagement between the drive roller and the bottom of the freight container causes the movement of the cam control unit to be blocked and the drive roller is pressed against the bottom of the freight container. That also causes the output of the planetary transmission, which drives the cam control unit, to be blocked, so that the other output of the planetary transmission, which drives the drive roller, now transmits to the drive roller a torque which overcomes the torque of the slipping clutch so that the drive roller, in a condition of being pressed against the bottom of the freight container, begins to rotate and the container is accordingly displaced on the conveyor track in a direction which is dependent on the direction of rotation of the drive motor.

A problem which arises with that arrangement in a practical context is that the entire transmission arrangement for transmitting torque from the motor to the drive roller on the one hand and the cam control unit on the other hand is of a very complicated configuration and involves a large number of components. That means that the costs involved in manufacture are high, while in addition the assembly is of a high weight and of large size, which is extremely undesirable in the context of aircraft engineering. In addition the large number of components which are movable relative to each other results in an undesirable susceptibility to wear and the periods of time between maintenance operations are short in order to ensure the high level of reliability required in operating aircraft.

Furthermore in that drive roller unit the slipping clutch is what is known as a fluid friction clutch, the operating characteristics of which are heavily dependent on temperature. Therefore, having regard to the high temperature differences which occur in operation in an aircraft freight compartment, it is necessary for the maximum torque of the slipping clutch to be selected at such a high value that the clutch torque does not fall below the minimum value required, even under the most disadvantageous temperature conditions. However that gives rise to very high force peaks when initiating the rotary movement of the drive roller when it is pressed against the bottom of a freight container, and such forces act on the floor structure of the aircraft freight compartment. That is extremely undesirable in practice as specific limit loadings in respect of the floor structure are not to be exceeded. In addition, shock loadings are basically considered to be disadvantageous.

More especially however the above-indicated prior drive roller unit is of a really large size and the individual components lie more or less unprotected next to each other so that in operation the unit is not only liable to suffer from fouling and defects and malfunctioning caused thereby, but it is also liable to suffer from damage due to objects which penetrate into the mechanism or by virtue of being directly subjected to an external force which interferes with the mechanism.

SUMMARY OF THE INVENTION

An object of the present invention is to provide a drive roller unit for driving an article on a conveyor track, which has a considerably reduced number of mutually movable components and which is of reduced size and can thus be of lower overall weight.

Another object of the present invention is to provide a drive roller unit for driving articles on a conveyor track, which affords enhanced reliability of operation while being of a simple and compact structural configuration.

Still another object of the present invention is to provide a drive roller unit for moving an article on a conveyor track, which can be readily fitted into a conveyor track assembly as required.

In accordance with the present invention, these and other objects are attained by the invention set forth herein.

As will be seen in greater detail hereinafter therefore, the design configuration according to the invention provides that the electric motor extends over the major part of the length of the mounting frame structure from the end at which it is pivotally mounted towards the free end thereof, which is raised and lowered between the rest position and the operative position, by means of the cam control unit. The main transmission arrangement, by means of which the speed of rotation of the drive motor can be stepped down on the one hand and on the other hand the torque produced by the motor is distributed to the first and second outputs of the main transmission arrangement can be directly connected to the end of the motor, which is towards the free end of the mounting frame structure. Then the cam which serves to lift the mounting frame structure at its free end can be, in particular integrally, connected to the one output of the main transmission arrangement. That design configuration therefore has no need for any torque-transmitting transmission assemblies comprising gears which mesh with each other and/or chain wheels which are connected together by chains, between the cam and the respective output of the main transmission arrangement. By virtue of the arrangement of the motor, in accordance with the principles of the invention, the second output of the main transmission arrangement can also be connected integrally or by simple gear engagement with the input shaft of the further transmission arrangement which serves to change over the direction of rotation; it may be noted here that the output member of the further transmission arrangement may be formed directly by the support body of the drive roller.

The distance between the cam for raising and lowering movement of the mounting frame structure, and the pivot axis about which the mounting frame structure is pivotable, such distance being governed by the length of the motor and the main transmission arrangement connected thereto, affords the arrangement a sufficiently long lever arm for operative displacement of the free end of the mounting frame structure between its lowered rest position and its raised operative position, so that there is no need to employ an electric motor with a particularly high level of torque in order to achieve the desired pressure force with which the drive roller is to be pressed against the underside of the respective article to be driven by the drive roller unit.

In accordance with a preferred feature of the invention, the main transmission arrangement can be in the form of a two-stage planetary transmission in which the first stage serves only for reducing the speed of rotation while the second stage has the two alternately operating outputs of which one can be formed for example by the planet wheel carrier and the other can be formed by the crown wheel or annular gear of the second stage. That makes it possible for a shaft which is integrally connected to the planet wheel carrier of the second stage and which is arranged in concentric relationship with the axis of rotation thereof to project towards the drive shaft and to be formed directly as the input shaft of the second transmission arrangement. The cam is then formed by a for example cylindrical cam body, the outside surface of which is supported on a mounting body connected to the base structure, and rolls thereon, and which has an eccentrically disposed cavity therein, of circular cross-section, which has an internal tooth configuration forming the crown wheel of the second planetary transmission stage. That structure involves a particularly small number of force-transmitting movable components in the transmission assembly. It will be appreciated that with that design configuration the drive roller must be divided in the middle in order to provide between the two resulting parts of the roller space to receive the further transmission assembly which produces the 90° change in the direction of rotation.

As an alternative to that design configuration, the cam may be in the form of a solid body which is integrally connected to the planet wheel carrier of the second stage of the planetary transmission and which is arranged in eccentric relationship with respect to the axis of rotation thereof. That cam bears with its outside surface on a mounting body connected to the base structure, and rolls upon same when the planet wheel carrier rotates. In that case the crown wheel is formed by the internal tooth configuration of a cylindrical hollow body, the outside peripheral surface of which is arranged concentrically with respect to the axis of rotation of the crown wheel and is provided with an external tooth configuration engaging into a gear which is arranged laterally with respect to the longitudinal axis of the entire arrangement and which is non-rotatably connected to the input shaft of the further transmission arrangement. Admittedly that design configuration, with the hollow body which bears the crown wheel at its inside, involves an additional movable component in the main transmission arrangement, but it gives the advantage that the input shaft of the further transmission arrangement and that transmission arrangement can be arranged in displaced relationship relative to the longitudinal axis of the assembly, on one side of the drive roller, so that there is no need for the drive roller to be divided into two.

A requirement which frequently arises in respect of drive roller units of the kind in accordance with the invention is that, when the power for the electric motor is switched off, while the drive roller is in its raised operative position, the roller should not automatically move downwardly into the rest position and should not perform a rotational movement in the opposite direction to the previous direction of rotation thereof. That requirement is intended to ensure that an article which is just being coveyed over an inclined surface by means of the drive roller unit does not automatically move downwardly over the inclined surface, when the power for the drive roller unit is switched off. In a preferred feature of the invention those requirements can be achieved in a particularly simple fashion by virtue of the further transmission arrangement disposed between the drive roller and the respective output of the main transmission arrangement being in the form of a transmission means which is adapted to be self-locking in respect of reverse rotary movement of the drive roller, preferably being a worm transmission means, while in addition the unit may preferably include a controllable locking means adapted to prevent the raised end of the mounting frame structure of the unit being moved downwardly from the raised operative position into the lowered rest position. In that connection, reverse rotary movement of the drive roller, irrespective of its direction of rotation, means a rotary movement which could occur as a result of torques which act on the drive roller when the electric motor is switched off.

It will be noted that designing the further transmission arrangement in the form of a self-locking transmission means, for example a worm transmission means, further affords the advantage that the frictional forces which occur in any case in such a transmission means are sufficient, when starting the drive roller unit, to produce the braking moment which ensures that it is initially the output of the main transmission arrangement which is set in movement, that actuates the cam assembly for lifting the mounting frame structure into its raised operative position. That means that the fluid friction clutch with was required in the prior-art unit as discussed above can be omitted, together with the attendant difficulties that it involved.

In a preferred feature the locking means for preventing the mounting frame structure from moving downwardly from the raised operative position into the lowered rest position includes an electrically actuable braking arrangement for preventing rotary movement of the output shaft of the electric motor. In accordance with a particularly preferred configuration the braking arrangement includes a brake disk which is non-rotatably connected to the output shaft of the electric motor and at least one disk-like brake body which is fixed with respect to the rotary movement of the output shaft, wherein axial displacement can be produced between the brake disk and the disk-like brake body in such a way that the brake disk and the disk-like brake body can be pressed against each other with their mutually oppositely disposed flat sides in order to restrain the output shaft of the electric motor and can be separated from each other to release the output shaft for rotary movement. The brake disk and the disk-like brake body can be pressed against each other by means of an electromagnet device and separated from each other by means of a spring. With this arrangement actuation of the electromagnet device takes place whenever the motor of the drive roller unit is switched on and movement of an article which is resting on the drive roller is to be prevented. The advantage of that arrangement is that, if total power failure occurs so that the electric motor cannot be switched on again, the electromagnet device is also no longer supplied with power so that the drive roller moves downwardly and comes out of engagement with the underside of the article being conveyed thereby. That makes it possible for an article disposed above the drive roller unit then to be conveyed further by hand.

Another preferred feature of the invention provides that the brake disk and the disk-like brake body can be pressed against each other by means of a spring and separated from each other by means of an electromagnet device. That design configuration gives the advantage that the electromagnet device and the electric motor can be actuated in synchronism and the assembly does not consume any current in the rest condition. It will be appreciated that, in the event of a total power failure, the drive rollers must be lowered by hand so that the articles disposed on the conveyor track in which the drive roller units are operable can be further displaced by hand thereon, without such movement being blocked by the drive rollers of the drive roller units still engaging the underside of the respective article.

In a preferred feature, not just the drive roller but also the electric motor, the main transmission arrangement, the cam control unit and the further transmission arrangement are mounted on the mounting frame structure. That means that the path for the transmission of torque from the respective output of the main transmission arrangement to the drive roller is of the same configuration in all positions of the mounting frame structure, which results in a particularly simple structural configuration.

Preferably the base means for the drive roller unit is directly afforded by a conveyor track panel portion having an assembly channel in which the drive roller unit can be fixed by the pivot axis of the mounting frame structure being fitted into one of the mountings which are provided in such a panel portion for the support rollers which do not vary in position with respect to the panel portion.

Other objects, features and advantages of the invention will be apparent from the following description of the preferred embodiments of the invention.

DESCRIPTION OF PREFERRED EMBODIMENTS

Figure 1:
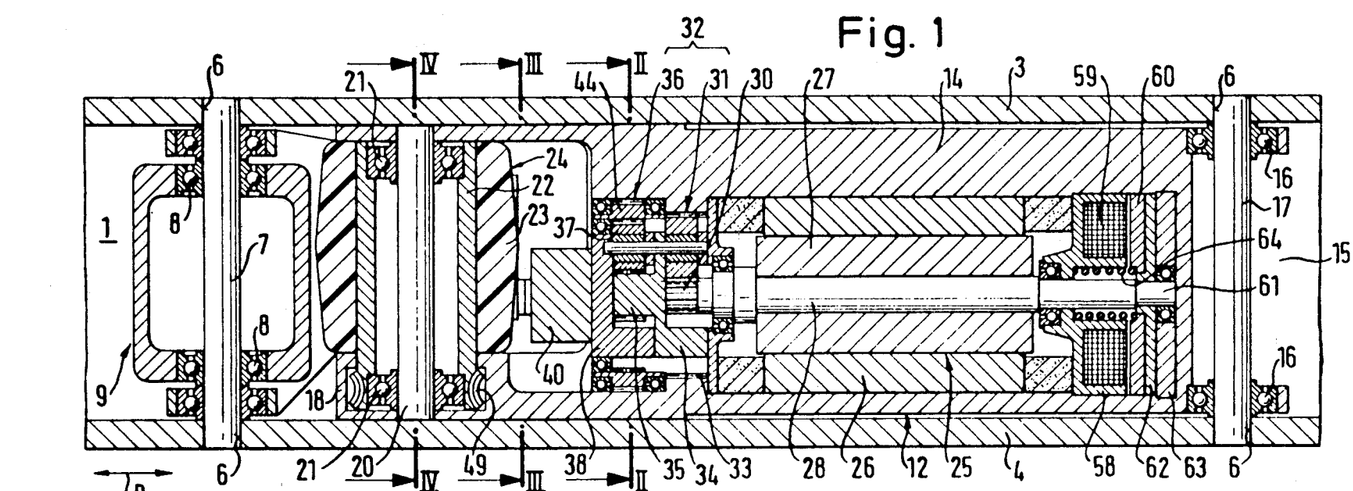
FIG. 1 is a view in horizontal section through an embodiment of a drive roller unit according to the invention, which is fitted into an assembly channel in a conveyor track panel portion.

Referring firstly to FIG. 1, shown therein as a view from above is the assembly or mounting channel 1 of a conveyor track panel portion, of which only the two sectioned side walls 3 and 4 are illustrated. The panel portion forms part of a conveyor track on which articles are to be appropriately moved, being driven by a drive roller unit. It will be noted that the side walls 3 and 4 of the channel 1 are provided at regular spacings with mutually oppositely disposed recesses 6 into which shafts 7 can be so fitted that they are retained in the recesses 6 by retaining or snap-engagement connections (not shown). Only one shaft 7 is shown in FIG. 1, and mounted on that shaft 7 by means of bearings 8 is a support roller 9 which is so disposed that it can rotate freely about the axis of the associated shaft 7, which extends transversely with respect to the longitudinal direction of the channel 1. The peripheral surfaces of the support rollers 9 project upwardly, that is to say towards the viewer of FIG. 1, beyond the top side of the conveyor track panel portion so that an article which is to be moved over the conveyor track panel portions rests on the support rollers 9 and can move in a direction which is substantially parallel to the longitudinal direction of the channel 1 and which is indicated by the doubleheaded arrow R in FIG. 1. Such conveyor track panel portions as are used predominantly in flight freight traffic have a plurality of mutually parallel channels 1 which are of the above-described configuration and which are fitted with a plurality of support rollers 9.

Also mounted on the conveyor track panel portions are pluralities of drive roller units of which just one is also illustrated at reference numeral 12 in FIG. 1. The drive roller unit 12 is of such a slender configuration that it can be disposed in a position of being completely sunk or lowered into the channel 1. As its load-bearing element, the drive roller unit 12 has a mounting frame or support structure 14 which is in the form of a compact housing and which is mounted pivotably on a shaft 17 by means of bearings 16 at its end 15 which is at the right in FIG. 1. The shaft 17 is fitted into and retained in recesses 6 in the side walls 3 and 4 of the channel 1, in the same manner as described above in relation to the shafts 7 for the support rollers 9.

In the region of the end 18 of the mounting frame structure 14, which is in opposite relationship to the pivotably mounted end 15, the mounting frame structure 14 carries a shaft 20 which is parallel to the shaft 17 and on which the roller body 22 of a drive roller 24 is rotatably mounted by means of bearings 21. On its external cylindrical peripheral surface the roller body 22 carries a roller shell or casing portion 23 comprising a material such as for example plastic material or rubber which affords good adhesion in relation to the underside of the articles to be conveyed over the roller track, while also exhibiting good wear resistance.

Provided in the interior of the housing structure formed by the mounting frame structure 14 is an electric motor 25 of which the drawing only diagrammatically shows the stator 26 which is fixedly connected to the mounting frame structure 14, and the rotatably mounted rotor 27. The electric motor 25 can be of conventional design and has the usual windings and/or permanent magnets. Non-rotatably connected to the rotor 27 of the electric motor 25 is the output shaft 28 of the electric motor 25, which, in accordance with the principles of the invention, is arranged in the direction of the longitudinal axis of the channel 1, that is to say in the direction of movement of the articles to be moved on the conveyor track, and thus perpendicularly to the direction of the axes of rotation of the mounting shafts 7, 17 and 20. The end of the output shaft 28 of the electric motor 25, which is towards the drive roller 24, projects beyond the motor casing and is non-rotatably connected to a gear 30. The gear forms the sun gear 30 of a planetary transmission which forms the first stage indicated at 31 of a main transmission arrangement generally indicated at 32. The associated crown wheel or annular gear 33 is mounted non-rotatably as the first stage of the main transmission arrangement only serves for stepping down the output speed of rotation. The planet wheel carrier 34, on its side towards the drive roller 24, carries a gear 35 which is non-rotatably connected thereto and which is arranged in concentric relationship and which is the sun gear of the second stage 36, which is also in the form of a planetary transmission, of the main transmission arrangement 32.

Figure 2:
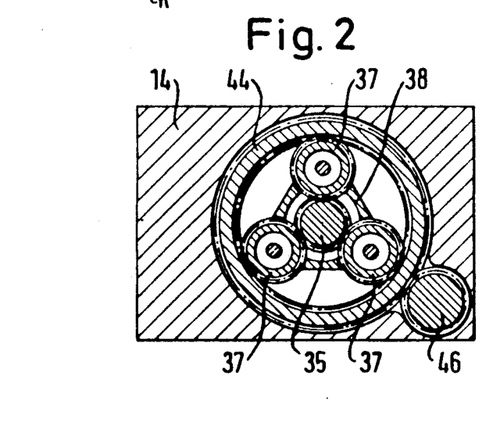
FIG. 2 is a view in vertical section taken along line II—II in FIG. 1 through the drive roller unit.

As can be seen more particularly from FIG. 2, the planet gears 37 of the second stage 36 of the main transmission arrangement 32 are mounted rotatably on a planet gear carrier 38 which in turn is mounted rotatably coaxially with the output shaft 28 of the electric motor 25. On its side which is towards the drive roller 24 the planet gear carrier 38 carries a cam 40 which is arranged eccentrically with respect to the shaft just referred to above, and with which it is preferably formed integrally.

Figure 4:
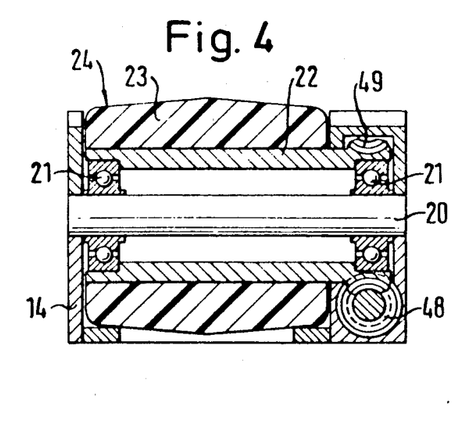
FIG. 4 is a view in vertical section taken along line IV—IV in FIG. 1 through the drive roller unit.
Figure 5A:
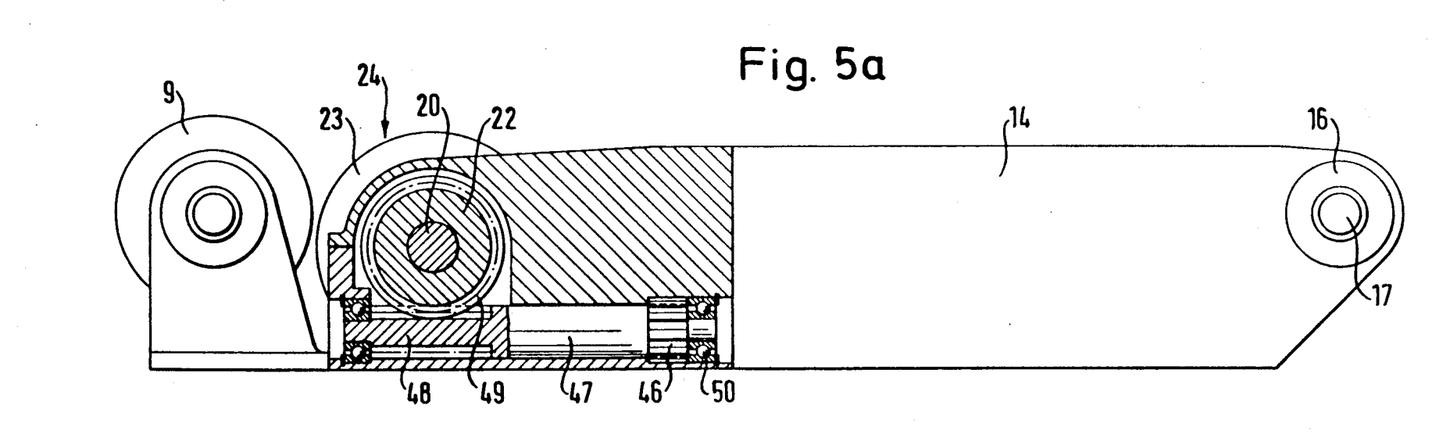
FIGS. 5a and 5b are partly sectional side views of the drive roller unit shown in FIGS. 1 through 4 in the lowered rest position and the raised operative position respectively, with the conveyor track panel portion being omitted for the sake of enhanced clarity of the drawing.

As FIG. 2 shows, the planet gears 37 in the second stage 36 are enclosed by a hollow circular cylinder 44 which on its inside surface has a tooth configuration which serves as the crown wheel or annular gear of the second stage 36. Also provided on the outside of the cylinder 44 is a tooth configuration which meshes with a gear 46 which is not shown in FIG. 1 but which can be seen in FIG. 2. As can be seen in particular from FIG. 5a, the gear 46 is non-rotatably fixed on a shaft 47 which extends laterally to a position below the drive roller 24. FIGS. 4 and 5a in particular show that the shaft 47 is rotatably supported by a bearing 50 on the mounting frame structure 14, at the end of the shaft 47 which is towards the right in FIG. 5a. The end region of the shaft 47, which is towards the left in FIGS. 5a and 5b and which is thus disposed beneath the drive roller 24 is in the form of a worm 48 engaging into worm gear 49 which is arranged above same and which is formed in one piece with the roller body 22 of the drive roller 24. In that way therefore the cylinder 44 forms the one output of the main transmission arrangement 32 which is operable to drive the drive roller 24 by way of its external tooth configuration, the gear 46, the shaft 47, the worm 48 and the worm gear 49.

Figure 3:
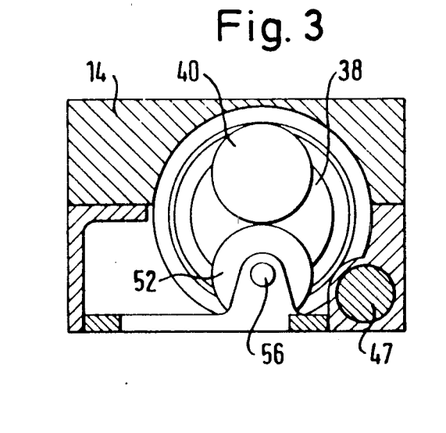
FIG. 3 is a view in vertical section taken along line III—III in FIG. 1 through the drive roller unit.

The other output of the main transmission arrangement 32 is formed by the planet gear carrier 38 on which the cam 40 is eccentrically mounted, as already mentioned above. As can be seen more particularly from FIG. 3, the cam 40 which in this case is in the form of a circular cylinder rests on a mounting body 52 which is also in the form of a circular cylinder in the vertical section shown in FIG. 3. As can also be seen from FIG. 5b, the mounting body 52 is mounted on an inner race 55 by way of bearing balls 54 in such a way that it can rotate about a pin 56 extending in the longitudinal direction of the channel 1 and can tilt about an axis which is perpendicular to the pin 56 and parallel to the pivotal mounting shaft 17. In that way, for the purposes of reducing friction, the mounting body 52 can also rotate when, because of a rotary movement of the planet gear carrier 38, the cam 40 rolls against the mounting body 52. The mounting body 52 can also tilt somewhat rearwardly, that is to say towards the pivotal mounting shaft 17, if, as a result of the rolling movement of the cam 40, the mounting frame structure 14 moves from its lowered rest position shown in FIG. 5a into the raised operative position shown in FIG. 5b. That ensures that the outside surface of the cam 40 constantly rests on the mounting body 52 along at least one generatrix.

The mode of operation of the above-described arrangement is such that, when the electric motor 25 is switched on with the assembly in the lowered rest position shown in FIG. 5a, that one of the two outputs of the second stage 36 of the main transmission arrangement 32 which is subjected to the lower braking moments firstly begins to rotate. There are only very slight static friction forces as between the mounting body 52 and the cam 40 which bears thereagainst. In comparison, the frictional forces between the external tooth configuration on the hollow cylinder 44 and the gear 46 and in particular between the external tooth configuration on the hollow cylinder 44 and the gear 46 and in particular between the worm 48 and the worm gear 49 are substantially greater. In addition, the last-mentioned assembly, together with the drive roller 24, is of a substantially greater mass and therefore also exhibits substantially greater inertia than the cam 40.

Figure 5B:
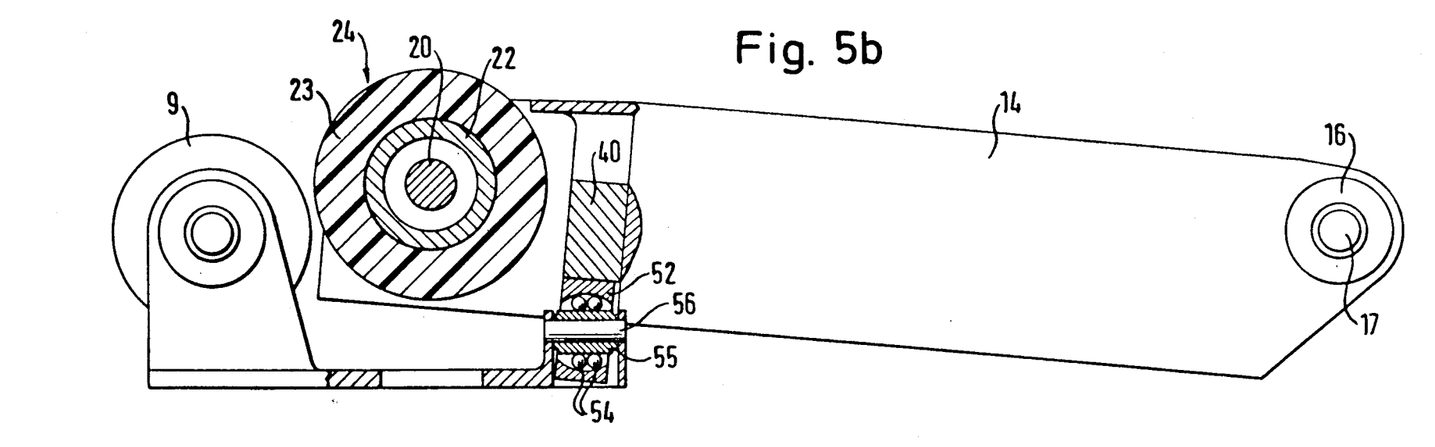

The result of that is that, when the motor 25 begins to operate, firstly the planet gear carrier 38 begins to rotate so that the cam 40 rolls against the mounting body 52 and thus the free end 18 of the mounting frame structure 14 is raised from the lowered rest position shown in FIG. 5a into the raised operative position shown in FIG. 5b.

If at that moment an article which is to be conveyed on the conveyor track is disposed above the drive roller unit 12, then by virtue of that upward movement the drive roller 24 is pressed with its peripheral surface of its roller casing portion 23 against the underside of the article, whereby the braking moments which oppose the rotary movement of the planet gear carrier 38 become greater than the braking moments which prevent rotary movement of the cylinder 44. That terminates the rotary movement of the planet gear carrier 38 and the crown wheel and therewith the hollow cylinder 44 of the second stage 36 begin to rotate. That rotary movement is transmitted by way of the external tooth configuration, the gear 46, the shaft 47, the worm 48 and the worm gear 49 to the drive roller 24 which begins to rotate about the axis of its shaft 20 and in so doing begins to move the article which is resting thereon, further along in the direction of movement which is governed by its direction of rotation, being therefore one of the two directions indicated by the double-headed arrow R in FIG. 1. If at a moment at which the electric motor 25 is actuated with the drive roller unit in the lowered rest position, there is no article to be conveyed disposed above the drive roller unit 12, the cam 40 also lifts the free end 18 of the mounting frame structure 14 until that movement is restricted by a mechanical abutment (not shown). The result of that is that once again the braking moments acting on the rotary movement of the planet gear carrier 30 become greater than the braking moments at the hollow cylinder 44 so that the latter and therewith also the drive roller 24 begin to rotate.

The output shaft 28 of the electric motor 25 also projects out of the motor casing at the end which is at the right in FIG. 1 and which is thus in opposite relationship to the main transmission arrangement 32, and passes through the housing 58 which is mounted thereon in a stationary condition of an electromagnet device 59. On the side thereof which is towards the pivot mounting shaft 17, there is an armature plate 60 which does not rotate but which is axially displaceable in the direction of the output shaft 28 and through a central opening in which extends an extension portion 61 of the output shaft 28. A brake disk 62 which is non-rotatably connected to the output shaft while being axially displaceable thereon is mounted on the extension portion 61, being of the same diameter as the armature plate 60. Towards the pivot mounting shaft 17, that arrangement is terminated by a pressure plate 63 which is non-rotatably and immovably fixed in the mounting frame structure 14 and against which both the armature plate and the brake disk 62 are pressed by a coil spring 64 when the arrangement is in the rest condition, that is to say when the electromagnet device 59 is not energised. The coil spring 64 is disposed in the central passage in the casing 58, in coaxial relationship with the output shaft 28. The force of the coil spring 64 is so great that, in the above-mentioned rest or non-energised condition, the output shaft 28 is totally locked to prevent a rotary movement even when the free end 18 of the mounting frame structure 14 is in the raised position and thus the peripheral surface of the roller casing portion 23 is pressed against an article disposed above the drive roller unit 12. As moreover the self-locking action of the screw transmission assembly 48, 49 means that the drive roller 24 cannot rotate by virtue of forces tangentially engaging the casing portion 23 thereof, in that way an article which is disposed on the conveyor track above the roller drive unit 12 is fixed in its instantaneous position.

In this construction the electromagnet device 59 is connected in series with the electric motor 25 so that, when the electric motor 25 is switched on, the electromagnet device 59 pulls the armature plate 60 in the axial direction away from the brake disk 62, against the force of the coil spring 64. That results in the brake disk 62 and therewith the output shaft 28 of the electric motor 25 being released to permit the desired rotary movement.

Figure 6:
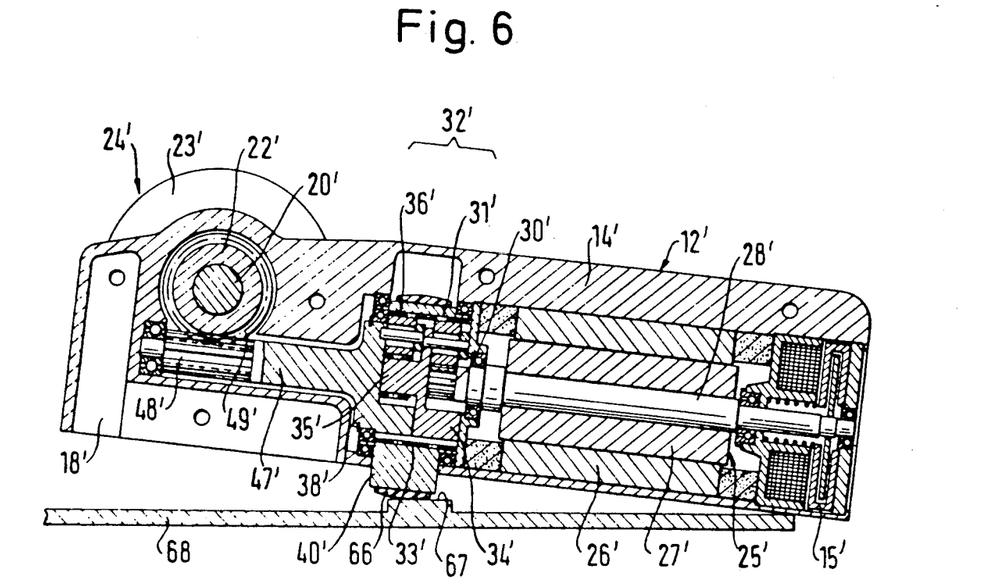
FIG. 6 is a completely sectional side view, corresponding to that shown in FIG. 5b, of another embodiment of the invention in which the first and second outputs of the main transmission arrangement are interchanged in relation to the embodiment shown in FIGS. 1 through 5b.

Reference will now be made to FIG. 6 showing a second embodiment of a drive roller unit according to the invention, in which parts which correspond to the parts of the embodiment described with reference to FIGS. 1 through 5b are denoted by the same reference numerals, but with the addition of a prime ('). The FIG. 6 construction is a somewhat modified design configuration, in which respect however only an important difference will be discussed in detail hereinafter. That difference is that the planet gear carrier 38' of the second state 36' carries, on its side which is towards the drive roller 24', a shaft 47' which is formed integrally therewith and which is arranged to concentric relationship and which extends to a position beneath the shaft 20' of the drive roller 24' and in that region is in the form of a worm 48'. Here too, carried on the shaft 20' is a worm gear 49' which is non-rotatably connected thereto and which is engaged with the worm 48'. That means therefore that in this construction, the drive roller 24' rotates when the planet gear carrier 38', which forms the corresponding output of the second stage 36', rotates. As in this construction the shaft 47' extends along the longitudinal center line of the assembly, the drive roller 24' must be divided into first and second drive roller portions which are arranged on the right and on the left beside the longitudinal center line, as viewed in the direction of movement, FIG. 6 showing the roller portion which is behind the plane in which the sectional view is taken. The worm transmission assembly 48' and 49' is then disposed between those two roller portions.

In this embodiment the cam 40' is formed by a body with a circular-cylindrical peripheral surface, having an eccentrically disposed bore extending therethrough.

The bore has an internal tooth configuration forming a crown wheel which is common to the two stages 31' and 36' of the main transmission arrangement 32'. In this embodiment disposed on the outside cylindrical surface of the cam 40' is a casing or shell portion 66 which improves the contact with a support portion 67 of a base element 68.

It will be seen from FIG. 6 that, by virtue of a corresponding rotary movement of the output shaft 28' of the electric motor 25', the cam 40' has rotated downwardly and has thereby lifted the free end 18' of the mounting frame structure 14' into the raised operative position. In the sectional view shown in FIG. 6, it is not possible to see the pivot axis about which that lifting movement occurs, but it is present in a manner corresponding to the situation obtaining in the first embodiment described above with reference to FIGS. 1 through 5a.

It will be seen that, in the second embodiment shown in FIG. 6, the two outputs of the second state 36' of the main transmission arrangement 32' are precisely interchanged in terms of their function, relative to the first embodiment. That involves a simplification insofar as the body which here carries the internal tooth configuration serving as the crown wheel of the second stage 36' does not require any external tooth configuration. This arrangement can also omit the gear 46 which engages into the above-mentioned external tooth configuration, as well as the bearing arrangement shown in FIG. 5a at 50.

In this embodiment the braking arrangement is also of a somewhat different design configuration from the embodiment of FIGS. 1 through 5b. This aspect is described greater detail hereinafter with reference to FIG. 7.

Figure 7:
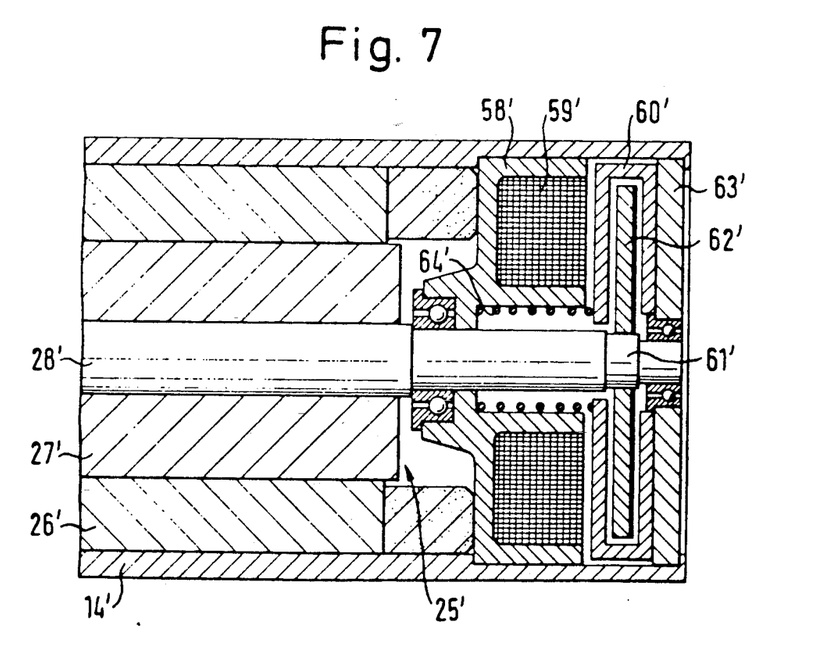
FIG. 7 is a view corresponding to that shown in FIG. 1 of a modified braking arrangement.

As can be seen from FIG. 7, in this embodiment also, carried on the extension portion 61' of the output shaft 28' of the electric motor 25' is a brake disk 62' which is connected to the extension portion 61' not only non-rotatably but also axially immovably. In this construction the armature plate 60' is substantially thicker in the axial direction than in the first embodiment, and has a disk-shaped, radially extending internal space or cavity (not referenced in FIG. 7), in which the brake disk 62' is disposed. In the operative condition shown in FIG. 7, the armature plate 60' is urged towards the right and against the pressure plate 63' by the force of the coil spring 64'. The disk-shaped internal space in the armature plate 60' is of such dimensions that the brake disk 62' can freely rotate therein, in that position. In that position the flat side of the armature plate 60', which faces towards the electromagnet device 59', is at a spacing from the electromagnet device 59', which is somewhat greater than the spacing between the flat side of the brake disk 62', which faces towards the right in FIG. 7, and the surface, which is opposite to that flat side, of the disk-shaped space within the armature plate 60'.

With this arrangement, the electromagnet device 59' is operated in opposed relationship with respect to the electric motor 25'. If therefore a rotary movement of the output shaft 28' is to be prevented when the electric motor 25' is switched off, the electromagnet device 59' is energised whereby it draws the armature plate 60' towards the left in FIG. 7. As a result the flat inward side of the armature plate 60', which is disposed in opposite relationship to the flat right-hand side of the brake disk 62' is urged against the brake disk 62' so strongly that that disk and therewith also the shaft 28' non-rotatably connected therewith can no longer turn. When the current flowing through the electromagnet device 59' is switched off, the spring 64' then presses the armature plate 60' against the pressure plate 63' again so that the brake disk 62' is freed for rotary movement.

In a modification of the above-described cams 40 and 40', the external contour thereof may also be of a cross-section which differs from a circular configuration if there is a wish to produce particular movements and/or forces during the operations involving upward and downward motions of the free end 18 or 18' of the mounting frame structure 14 or 14'.

It will be appreciated from the foregoing that the above-described configurations of the drive roller unit according to the invention involve a greatly reduced number of parts and thus also a reduced overall weight, in comparison with the previous design. The invention provides a unit of very slender configuration, the longitudinal extent of which extends substantially parallel to the direction of movement of the articles to be conveyed while its width is determined substantially by the width of the drive roller and the means for mounting it on the mounting frame structure. The height of the assembly is also no greater than the diameter of the drive roller as all other components of the unit can be so designed that the lower edge of the unit approximately coincides with the lowest point on the periphery of the drive roller while its upper edge is markedly lower than the uppermost generatrix of the drive roller.

That therefore results in two substantial advantages: firstly, within the limits which are governed by the cross-sectional dimensions of the drive roller there is sufficient space for the mounting frame structure to be constructed in the form of a strong, robust casing which covers, in particular from above, all the parts of the drive roller unit, with the exception of the drive roller itself, and thus protects those parts from contamination and damage. Secondly, by virtue of the fact that the entire unit can be of a slender configuration insofar as its cross-sectional dimensions are determined by the dimensions of the drive roller, it is possible for the entire unit to be disposed in one of the assembly or mounting channels which are conventionally to be found in the present day conveyor track panel portions in aircraft design and which extend in the direction of movement of the articles or conveyors to be conveyed thereon, in such a fashion that, when the drive roller unit is in the lowered position, the drive roller completely disappears within that channel. In particular the drive roller unit according to the invention can be of such a construction that it can be used in a mounting or assembly channel of that kind, in place of one of the carrier rollers which are primarily arranged therein.

Still another advantage of the drive roller unit according to the invention is that the length of the motor is practically unrestricted. If therefore in particular situations of use there is a requirement for a more powerful motor, that aim can be achieved by using a motor of correspondingly increased length but with the same cross-sectional dimensions.

It will be appreciated that the above-described constructions according to the invention have been set forth solely by way of example and illustration of the invention and that various other modifications and alternations may be made therein without thereby departing from the spirit and scope of the invention.

It will further be appreciated that the reference numerals contained in the appended claims are included to

What is claimed is:

1. A drive roller unit for driving articles on a conveyor track, comprising a mounting frame structure (14, 14') having first and second end portions (15, 18, 18'), means (16, 17, 17') for mounting the mounting frame structure (14, 14') at its first end portion to the conveyor track pivotably about a pivot axis (17, 17') extending substantially transversely to the direction of movement of articles on the conveyor track such that its oppositely disposed second end portion (18, 18') is adapted to be reciprocated between a lowered rest position and a raised operative position, a cam control means (40, 52, 40', 66) operable for said reciprocating movement of said mounting frame structure, a drive roller (24, 24') rotatably mounted in the region of said second end portion (18, 18') of the mounting frame structure (14, 14'), such that in its lowered rest position the drive roller (24, 24') does not come into contact with an article disposed on the conveyor track and in the raised operative position the drive roller (24, 24') comes into engagement with the underside of such an article, an electric motor (25, 25') having its axis of rotation disposed substantially parallel to the direction of movement of said articles and substantially perpendicular to the direction of the axis of rotation (20, 20') of the drive roller (24, 24'), a main transmission arrangement (32, 32') adapted to be driven by the electric motor (25, 25') and having first and second outputs of which one is adapted to actuate the cam control unit (40, 52, 40', 66) and the other is adapted to drive the drive roller (24, 24') in rotation and of which when the electric motor (25, 25') is running it is only ever that output which is subject to the lower braking moment that rotates, and a further transmission arrangement (46, 47, 48, 49, 48', 49') operatively disposed between said other output of said main transmission arrangement (32, 32') and said drive roller (24, 24') and having an angle of at least approximately 90° between its input direction of rotation and its output direction of rotation.

2. A drive roller unit as set forth in claim 1 wherein the main transmission arrangement (32, 32') includes at least one planetary transmission means (36, 36') having first and second outputs of which one is operable to drive the cam control unit (40, 52, 40', 66) and the other is operable to drive the further transmission arrangement (46, 47, 48, 49, 48', 49').

3. A drive roller unit as set forth in claim 1 wherein said planetary transmission means (36) forms a second stage of the main transmission arrangement (32) and comprises a crown wheel forming the other output of said main transmission arrangement (32) adapted to drive the further transmission arrangement (46, 47, 48, 49) and a planet wheel carrier adapted to drive the cam control unit (40, 52).

4. A drive roller unit as set forth in claim 2 wherein said planetary transmission means (36') forms a second stage of said main transmission arrangement (32') and comprises a crown wheel forming said one output of said main transmission arrangement (32) adapted to actuate the cam control means (40', 66) and a planet wheel carrier (38') adapted to drive said further transmission arrangement (48', 49').

5. A drive roller unit as set forth in claim 1 wherein the further transmission arrangement (46, 47, 48, 49, 48', 49') disposed between the drive roller (24, 24') and the respective output of the main transmission arrangement (32, 32') includes a transmission means adapted to be self-locking in respect of reverse rotary movement of the drive roller (24, 24'), and further including a controllable locking means adapted to prevent the second end portion (18, 18') of the mounting frame structure (14, 14') when raised from moving downwardly out of the operative position into the rest position.

6. A drive roller unit as set forth in claim 5 wherein said further transmission arrangement (46, 47, 48, 48', 49') includes a worm transmission means.

7. A drive roller unit as set forth in claim 5 wherein said locking means includes an electrically actuable braking means (60, 62, 63, 60', 62', 63') for preventing rotary movement of the output shaft (28, 28') of the electric motor (25, 25').

8. A drive roller unit as set forth in claim 7 wherein the braking means includes a brake disk (62, 62') non-rotatably connected to the output shaft (28, 28') of the electric motor (25, 25'), at least one stationary disk body (60, 60') and means for axial displacement between the brake disk (62, 62') and the disk body (60, 60') such that the brake disk (62, 62') and the disk body (60, 60') are adapted to be pressed against each other with mutually oppositely disposed flat sides thereof in order to restrain the electric motor output shaft (28, 28') and are adapted to be separated from each other to release the electric output shaft (28, 28') for rotary movement.

9. A drive roller unit as set forth in claim 8 including an electromagnet means (59') operable to press the brake disk (62) and the disk body (60') against each other and spring means (64') urging the brake disk (62') and the disk body (60') away from each other.

10. A drive roller unit as set forth in claim 8 including a spring (64) urging the brake disk (62) and the disk body (60) towards each other and an electromagnet means (59) operable to urge the brake disk (62) and the disk body (60) away from each other.

11. A drive roller unit as set forth in claim 1 wherein the electric motor (25, 25') and the main transmission arrangement (32, 32') are mounted on the mounting frame structure (14, 14').

12. A drive roller unit as set forth in claim 1 wherein said mounting means for pivotally mounting the mounting frame structure (14, 14') is a conveyor track panel portion.

* * * * *